United States Patent
Turtinen et al.

(10) Patent No.: US 12,048,008 B2
(45) Date of Patent: Jul. 23, 2024

(54) RANDOM ACCESS MESSAGE RETRANSMISSION IN UNLICENSED BAND

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

(*) Notice: Subject to any disclaimer, the term of this patent is extended or adjusted under 35 U.S.C. 154(b) by 408 days.

(21) Appl. No.: 17/604,907

(22) PCT Filed: Apr. 30, 2019

(86) PCT No.: PCT/CN2019/085358
§ 371 (c)(1),
(2) Date: Oct. 19, 2021

(87) PCT Pub. No.: WO2020/220338
PCT Pub. Date: Nov. 5, 2020

(65) Prior Publication Data
US 2022/0225410 A1     Jul. 14, 2022

(51) Int. Cl.
H04W 4/00     (2018.01)
H04L 1/08     (2006.01)
H04W 72/23     (2023.01)
H04W 74/08     (2009.01)
H04W 74/0816     (2024.01)
H04W 74/0833     (2024.01)

(52) U.S. Cl.
CPC ......... H04W 74/0816 (2013.01); H04L 1/08 (2013.01); H04W 72/23 (2023.01); H04W 74/0841 (2013.01); H04W 74/0866 (2013.01)

(58) Field of Classification Search
None
See application file for complete search history.

(56) References Cited

U.S. PATENT DOCUMENTS

| | | | |
|---|---|---|---|
| 2009/0316586 A1* | 12/2009 | Yi | H04W 74/002 370/242 |
| 2016/0338097 A1* | 11/2016 | Andreoli-Fang | H04W 74/006 |
| 2017/0231011 A1* | 8/2017 | Park | H04W 72/0446 |

(Continued)

FOREIGN PATENT DOCUMENTS

| | | |
|---|---|---|
| CN | 105103624 A | 11/2015 |
| CN | 107409370 A | 11/2017 |

(Continued)

OTHER PUBLICATIONS

Office action received for corresponding Chinese Patent Application No. 201980095920.7, dated Sep. 28, 2022, 8 pages of office action and no page of translation available.

(Continued)

*Primary Examiner* — Bob A Phunkulh
(74) *Attorney, Agent, or Firm* — Robert P. Michal, Esq.; Carter, DeLuca & Farrell LLP

(57) ABSTRACT

Systems, methods, apparatuses, and computer program products for random access procedures, for example when operating in unlicensed band, are provided. One method may include starting a retransmission timer when LBT failure is detected at a UE for one or more initial msg3 transmission opportunities. The method may also include determining whether a retransmission grant is received before expiry of the retransmission timer.

19 Claims, 2 Drawing Sheets

(56) References Cited

U.S. PATENT DOCUMENTS

| | | | | |
|---|---|---|---|---|
| 2017/0332358 | A1* | 11/2017 | Park | H04L 1/1671 |
| 2018/0176961 | A1* | 6/2018 | Babaei | H04W 74/0833 |
| 2019/0223255 | A1* | 7/2019 | Jeon | H04L 5/00 |
| 2020/0196354 | A1* | 6/2020 | Li | H04W 74/0833 |
| 2020/0359426 | A1* | 11/2020 | Pan | H04W 74/0833 |
| 2021/0007147 | A1* | 1/2021 | Yang | H04W 56/001 |
| 2021/0153245 | A1* | 5/2021 | Tooher | H04W 74/008 |
| 2021/0368545 | A1* | 11/2021 | Xu | H04W 74/0833 |
| 2022/0110153 | A1* | 4/2022 | Wu | H04W 74/0808 |

FOREIGN PATENT DOCUMENTS

| | | |
|---|---|---|
| CN | 107431591 A | 12/2017 |
| CN | 108476532 A | 8/2018 |
| WO | 2016/105570 A1 | 6/2016 |
| WO | 2020/164074 A1 | 8/2020 |

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"New WID on NR-based Access to Unlicensed Spectrum", 3GPP TSG RAN Meeting #82, RP-182878, Agenda: 9.1.1, Qualcomm Incorporated, Dec. 10-13, 2018, 8 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

International Search Report and Written Opinion received for corresponding Patent Cooperation Treaty Application No. PCT/CN2019/085358, dated Jan. 31, 2020, 9 pages.

"Random access procedure for NR-u", 3GPP TSG-RAN WG2 meeting #104, R2-1816696, Agenda: 11.2.1.1, Intel Corporation, Nov. 12-16, 2018, 6 pages.

"Enhance RACH with Additional Transmission Opportunities", 3GPP TSG-RAN WG2 Meeting #103bis, R2-1814262, Agenda: 11.2.1.1, vivo, Oct. 8-12, 2018, 5 pages.

Office action received for corresponding Chinese Patent Application No. 201980095920.7, dated May 31, 2023, 5 pages of office action and no page of translation available.

* cited by examiner

US 12,048,008 B2

RANDOM ACCESS MESSAGE RETRANSMISSION IN UNLICENSED BAND

RELATED APPLICATION

This application was originally filed as PCT Application No. PCT/CN2019/085358 on Apr. 30, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for random access procedures in such systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR can provide bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and/or may be named NG-eNB when built on E-UTRA radio.

SUMMARY

One embodiment is directed to a method that may include starting a retransmission timer when listen before talk failure is detected at a user equipment for one or more initial msg3 transmission opportunities. The method may also include determining whether a retransmission grant is received before expiry of the retransmission timer.

Another embodiment is directed to an apparatus that may include at least one processor and at least one memory including computer program code. The at least one memory and the computer program code may be configured, with the at least one processor, to cause the apparatus at least to start a retransmission timer when listen before talk failure is detected for one or more initial msg3 transmission opportunities, and to determine whether a retransmission grant is received before expiry of the retransmission timer.

Another embodiment is directed to an apparatus including means for starting a retransmission timer when listen before talk failure is detected at a user equipment for one or more initial msg3 transmission opportunities. The apparatus may also include means for determining whether a retransmission grant is received before expiry of the retransmission timer.

Another embodiment is directed to an apparatus that may include circuitry configured to start a retransmission timer when listen before talk failure is detected for one or more initial msg3 transmission opportunities, and circuitry configured to determine whether a retransmission grant is received before expiry of the retransmission timer.

Another embodiment is directed to a non-transitory computer readable medium comprising program instructions stored thereon for performing at least the following: starting a retransmission timer when listen before talk failure is detected at a user equipment for one or more initial msg3 transmission opportunities, and determining whether a retransmission grant is received before expiry of the retransmission timer.

In one example, when it is determined that no retransmission grant is received before expiry of the retransmission timer, it is determined that contention resolution is unsuccessful and the UE may fall back to random access resource selection.

In another example, when it is determined that a retransmission grant is received before expiry of the retransmission timer, the retransmission timer may be stopped and the UE may attempt to transmit msg3 on the retransmission grant.

BRIEF DESCRIPTION OF THE DRAWINGS

For proper understanding of example embodiments, reference should be made to the accompanying drawings, wherein.

DETAILED DESCRIPTION

Figure 1:
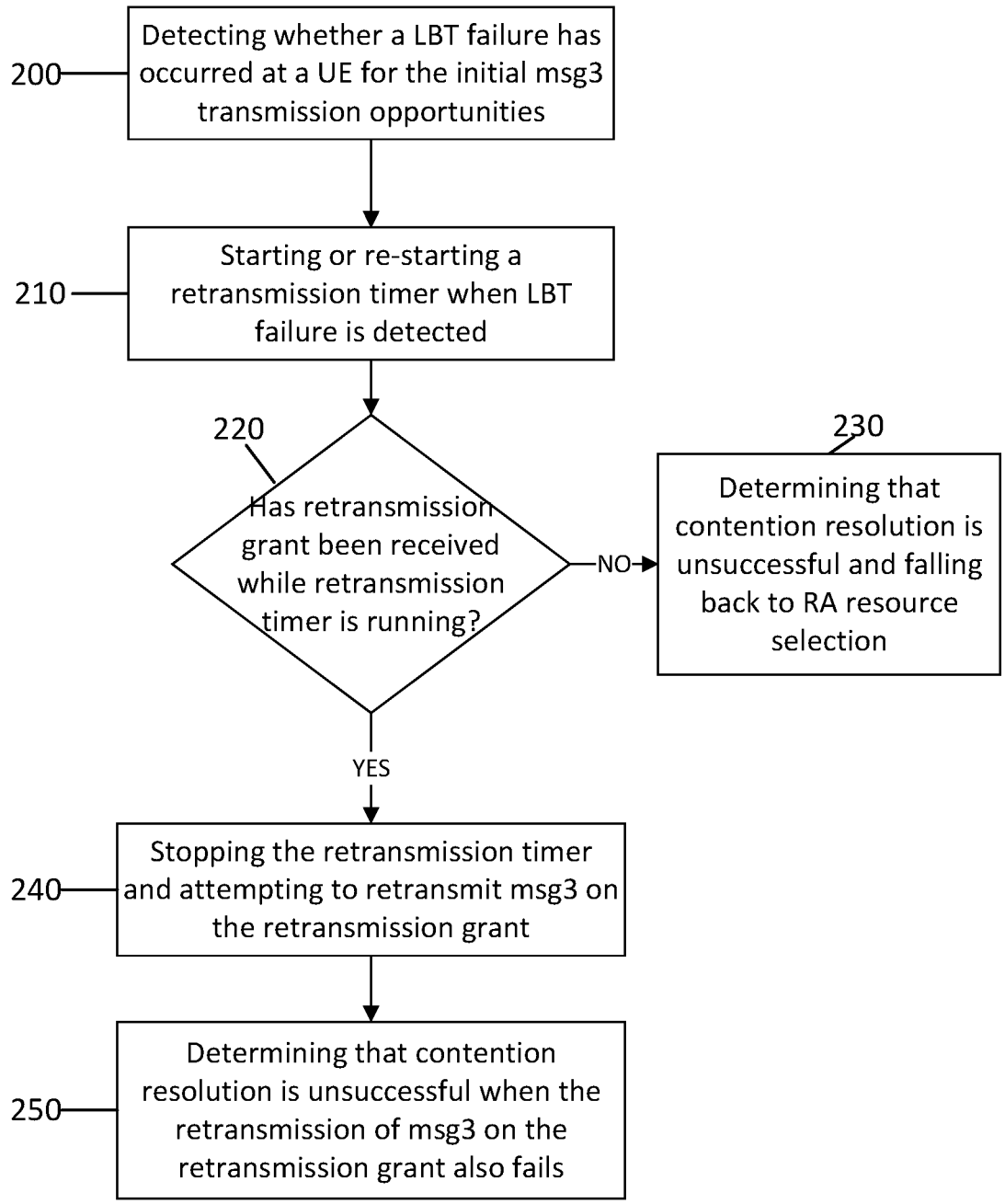
FIG. 1 illustrates an example flow diagram of a method, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for random access procedures, for example when operating in unlicensed band, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

As introduced above and discussed in more detail below, certain embodiments may relate to random access (RA) procedures including, for example, Msg3 transmission for NR radio operating in unlicensed spectrum.

3GPP RP-181339 includes updates to TR 38.889, where 4-step and 2-step random access channel (RACH) procedures will be supported for NR unlicensed (NR-U). For 4-step RACH procedure, the messages in time order are named as msg1, msg2, msg3, msg4, while for 2-step RACH procedure, the messages are named msgA and msgB. Thus, 2-step RACH procedure includes two steps for completing a complete contention-based random access (CBRA).

A 2-step RACH procedure may provide a reduction in the impact of listen before talk (LBT) through its reduction in the number of messages. However, in order to further reduce the impact of LBT failures, additional opportunities for the RACH messages may be introduced for both 4-step and 2-step RACH procedures, such as in time or frequency domain In particular, the additional opportunities for 4-step RACH procedure may be applicable to both msg1 and msg3. NR-U may support contention-free random access (CFRA) and CBRA for both 2-step and 4-step RACH procedure. With respect to secondary cells (SCells), CFRA may be supported as a baseline, while both CBRA and CFRA are supported on special cells (SpCells). A single RACH procedure i may be used, and multiple RACH procedures in parallel may not be supported for NR-U. As a baseline, the random access response for msg1 may be on a SpCell, while msg3 may be assumed to use a predetermined hybrid automatic repeat request (HARQ) identification (ID).

In legacy RACH procedure, counters for preamble transmission and power ramping may be increased with each attempt. In NR-U, power ramping may not be applied when the preamble is not transmitted due to LBT failure. As a result, an indication might be transmitted from the physical (PHY) layer to the MAC to indicate LBT failure/success. In addition, the ra-Response Window may not be started when the preamble is not transmitted due to LBT failure. It is assumed that the ra-ContentionResolutionTimer may need to be extended with larger values to overcome the impact of LBT.

For 2-step RACH procedure, msgA may be a signal to detect the UE and a payload, while the second message, msgB, may be for contention resolution for CBRA with a possible payload. msgA may at least include the equivalent information to that which is transmitted in msg1 and/or msg3 for 4-step RACH procedure. The contention resolution in 2-step RACH procedure may be performed by including a UE identifier in the first message, which may be echoed in the second message. If 2-step RACH is used for initial access, the parameters for 2-step RACH procedure including resources for msgA may be broadcasted.

For initial access and mobility procedures, one issue identified for NR operation in unlicensed band is the reduced transmission opportunities for different signals and channels due to LBT failure. As a result, some modifications to initial access procedures may be beneficial. For example, these may include modifications to initial access procedures considering limitations on access to the channel based on LBT, such as techniques to handle reduced synchronization signal (SS)/physical broadcast channel (PBCH) block and Remaining Minimum System Information (RMSI) transmission opportunities due to LBT failure. Other modifications may include enhancement to 4-step RACH, including developing mechanisms to handle reduced msg 1/2/3/4 transmission opportunities due to LBT failure.

Potential RACH resource enhancements may include frequency-domain enhancements and/or time-domain enhancements. A frequency-domain enhancement may include having multiple physical random access channel (PRACH) resources across multiple LBT sub-bands/carriers for both contention-free and contention-based RA. Time-domain enhancements may include, for connected mode UE, scheduling of PRACH resources via downlink control information (DCI) and, for idle mode UE, scheduling of PRACH resources via paging. Additional, new RACH resources may be used immediately following detection of DRS transmission. Multiple PRACH transmissions may be made before Msg2 reception in random access response (RAR) window for initial access Also, group wise SSB-to-RO mapping by frequency first-time second manner may be used, where grouping is in time domain.

For msg1 transmission of 4-step RACH procedure, if preamble transmissions are dropped due to LBT failure, then it is recommended that preamble power ramping is not performed and that the preamble transmission counter is not incremented. For msg 2 transmission in the 4-step RACH procedure, in some scenarios it is beneficial for the maximum RAR window size to be extended beyond 10 ms to improve robustness to downlink (DL) LBT failure for RAR transmission. Other candidate mechanisms may include include preconfigured/pre-indicated/scheduled multiple opportunities in time and/or frequency domain in different LBT subbands for message 2/3/4 transmissions and/or reducing the latency of the RACH procedure.

As discussed above, due to the possible LBT failures, some data transmissions will not happen when the channel is busy. For this, MAC will receive an indication from layer-1 (L1) about the occurrence of LBT failure. It has been agreed to provide support of multiple MSG3 transmission opportunities, and it is assumed that the range of the ra-ContentionResolutionTimer is not extended for NR-U. With this, either (a) the ra-ContentionResolutionTimer is started regardless of the LBT outcome of msg3 transmission or (b) ra-ContentionResolutionTimer is started only at successful LBT outcome of msg3 transmission and immediately the UE will restart from RACH resource selection if all msg3 transmissions fail. However, neither of these options is fully optimal from the both the UE and network point of view.

If the ra-ContentionResolutionTimer is started by the UE regardless of whether no Msg3 transmission happened, the network might not provide any re-transmission grant for the UE (as it does not know if the missing of UE transmission was due to continuous LBT failure or RAR reception failure) and the UE might stay awake, e.g., even up to 64 ms before declaring contention resolution failure due to the timer. On the other hand, this might also force the network to always try re-transmission grants, which would waste resources if the UE did not receive RAR. Furthermore, the ra-ContentionResolutionTimer is meant for allowing the network to decode the radio resource control (RRC) message included in Msg3 as well as prepare for RRC response to be sent to the UE after the Msg3 has been transmitted. Starting the timer upon unsuccessful Msg3 transmission might defeat its purpose as generally any re-transmission grant should not take up that much time.

If the ra-ContentionResolutionTimer is not started at all by the UE when Msg3 transmission did not happen and the UE falls back to preamble transmission phase, this is easy for the network as it does not need to perform blind re-transmission grants. On the other hand, this may increase the PRACH load as the UE will need to transmit preamble again although it succeeded already once.

Hence, certain embodiments provide an alternative behaviour for the UE in case it fails in transmitting in all the Msg3 transmission opportunities due to the LBT failures, which is more optimal for both the network and the UE.

One embodiment introduces a new timer, which may be referred to herein as a msg3RetxTimer as one example, to account for a possible Msg3 re-transmission grant sent by the network if the UE could not send the Msg3 due to LBT failure(s). It is noted that msg3RetxTimer is just one example of a label for the retransmission timer, and it should be understood that other naming conventions for the retransmission timer may be used.

In an embodiment, when LBT failure is declared at the UE for one or all of the initial transmission opportunities of Msg3, the msg3RetxTimer may be started. If no re-transmission grant is received before the msg3RetxTimer expiry, the contention resolution may be considered unsuccessful and the UE may fall back to RA resource selection, i.e., RA preamble transmission. If re-transmission grant is received during the msg3RetxTimer run, then multiple options may be provided according to certain embodiments. In one option, when re-transmission grant is received during the msg3RetxTimer run, then the msg3RetxTimer may be stopped and if the UE fails in transmitting also in the re-tx grant, the contention resolution may be considered unsuccessful. In another option, when re-transmission grant is received during the msg3RetxTimer run, then the msg3RetxTimer may be started or restarted every time the UE fails in transmitting also in the re-transmission grant—the msg3RetxTimer may or may not be stopped when the re-transmission grant is received in this case. In yet another option, when re-transmission grant is received during the msg3RetxTimer run, then the msg3RetxTimer is restarted at msg3 transmission (i.e., LBT success), i.e., in case of LBT failure, the timer continues running without restart.

Certain embodiments may define the ra-ContentionResolutionTimer behavior in conjunction with the msg3RetxTimer. For example, in an embodiment, the ra-ContentionResolutionTimer may be started after the initial Msg3 transmission opportunity or opportunities regardless of the LBT outcome and may be stopped if msg3RetxTimer expires. For instance, the ra-ContentionResolutionTimer may be restarted after each re-transmission opportunity or only after successful transmission of Msg3. In another embodiment, the ra-ContentionResolutionTimer may be started only after successful transmission of Msg3. In other words, in one example, the contention resolution may be dictated by the msg3RetxTimer before successful transmission of Msg3. In yet another embodiment, the ra-ContentionResolutionTimer may be stopped when msg3RetxTimer is started or restarted. In other words, in one example, the ra-ContentionResolutionTimer may not be running when msg3RetxTimer is running and vice versa.

In some embodiments, the number of re-transmission grant attempts may be configurable, i.e., the msg3RetxTimer is not started after the number of LBT failures happen for re-transmission grants but the contention resolution is immediately considered unsuccessful. This may only be needed in case the ra-ContentionResolutionTimer is started only after successful Msg3 transmission as otherwise the contention resolution timer could serve the purpose.

As mentioned above, certain embodiments may provide a process for retransmission of a random access message, such as msg3, in unlicensed spectrum. In an embodiment, the process may include, when a Msg3 is transmitted, if a notification of failure in transmitting the Msg3 is received from the lower layer for initial transmission or for HARQ retransmission, the MAC entity of a UE may start or restart a retransmission timer (e.g., msg3RetxTimer). According to an embodiment, if the msg3RetxTimer expires, then the MAC entity may discard the temporary C-RNTI and consider this contention resolution to be unsuccessful.

According to certain embodiments, once Msg3 is transmitted, the MAC entity may stop the msg3RetxTimer, start the ra-ContentionResolutionTimer and restart the ra-ContentionResolutionTimer at each successful HARQ retransmission in the first symbol after the end of the Msg3 transmission. The MAC entity may monitor the PDCCH while the ra-ContentionResolutionTimer is running regardless of the possible occurrence of a measurement gap. In an embodiment, if notification of a reception of a PDCCH transmission of the SpCell is received from lower layers and the C-RNTI MAC CE was included in Msg3, if the RA procedure was initiated by the MAC sublayer itself or by the RRC sublayer and the PDCCH transmission is addressed to the C-RNTI and contains a UL grant for a new transmission or if the RA procedure was initiated by a PDCCH order and the PDCCH transmission is addressed to the C-RNTI or if the RA procedure was initiated for beam failure recovery and the PDCCH transmission is addressed to the C-RNTI, then the MAC entity may consider this contention resolution successful, stop the ra-ContentionResolutionTimer, discard the temporary C-RNTI, and consider this RA procedure successfully completed.

Otherwise, if the CCCH SDU was included in Msg3 and the PDCCH transmission is addressed to its temporary C-RNTI and if the MAC PDU is successfully decoded, then the MAC entity may stop the ra-ContentionResolutionTimer and, if the MAC PDU contains a UE contention resolution identity MAC CE and the UE contention resolution identity in the MAC CE matches the CCCH SDU transmitted in Msg3, then the MAC entity may consider this contention resolution successful and finish the disassembly and de-multiplexing of the MAC PDU. Then, if this RA procedure was initiated for SI request, the MAC entity may indicate the reception of an acknowledgement for SI request to upper layers, discard the temporary C-RNTI, and consider this RA procedure successfully completed. If the RA procedure was not initiated for SI request, the MAC entity may set the C-RNTI to the value of the temporary C-RNTI. If the MAC PDU does not contain a UE contention resolution identity MAC CE and/or the UE contention resolution identity in the MAC CE does not match the CCCH SDU transmitted in Msg3, then the MAC entity may discard the temporary C-RNTI and consider this contention resolution not successful and discard the successfully decoded MAC PDU.

In an embodiment, when the ra-ContentionResolutionTimer expires, the MAC entity may discard the temporary C-RNTI and consider the contention resolution not successful. According to some embodiments, if the contention resolution is considered not successful, then the MAC entiy may flush the HARQ buffer used for transmission of the MAC PDU in the Msg3 buffer and increment a PREAMBLE_TRANSMISSION COUNTER by 1. In an embodiment, if the PREAMBLE_TRANSMISSION COUNTER=preambleTransMax+1, then the MAC entity may indicate a RA problem to upper layers and, if this RA procedure was triggered for SI request, then the MAC entity may consider the RA procedure to be unsuccessfully completed. In an embodiment, if the RA procedure is not completed, then the MAC entity may select a random backoff time according to a uniform distribution between 0 and the PREAMBLE_BACKOFF. If the criteria to select contention-free RA resources is met during the backoff time, then the MAC entity may perform the RA resource selection procedure. If the criteria to select contention-free RA resources is not met during the backoff time, then the MAC entity may perform the RAR selection procedure after the backoff time.

FIG. 1 illustrates an example flow diagram of a method, which may be performed by a UE, according to one embodiment. As illustrated in the example of FIG. 1, the method may include, at 200, determining or detecting whether a LBT failure has occurred at the UE for one, more or all of the initial msg3 transmission opportunities. In an embodiment, when LBT failure is detected or declared, the method may include, at 210, starting or re-starting a retransmission timer (e.g., msg3RetxTimer). The method may also include, at 220, checking for receipt of a retransmission grant while the retransmission timer is running.

When no retransmission grant is received before expiry of the retransmission timer, then the method may include, at 230, determining that contention resolution is unsuccessful and falling back to RA resource selection. When a retransmission grant is received before expiry of the retransmission timer, then the method may include, at 240, stopping the retransmission timer and attempting to retransmit msg3 on the retransmission grant. In an embodiment, when the retransmission of msg3 on the retransmission grant also fails, i.e., when there is LBT failure on the retransmission grant, then the method may include, at 250, determining that contention resolution is unsuccessful. In some embodiments, the method may include starting or restarting the retransmission timer if the retransmission of msg3 on the retransmission grant fails. According to another embodiment, the method may include restarting the retransmission timer at msg3 transmission (i.e., LBT success).

In an embodiment, the method may include starting a RA contention resolution timer (e.g., the ra-ContentionResolutionTimer) after the initial Msg3 transmission opportunity or opportunities regardless of the LBT outcome and stopping the RA contention resolution timer if the retransmission timer expires. For instance, in some embodiments, the RA contention resolution timer may be restarted after each re-transmission opportunity or only after successful transmission of Msg3. In another embodiment, the method may include starting the RA contention resolution timer after successful transmission of Msg3. In other words, in one example, the contention resolution may be dictated by the retransmission timer before successful transmission of Msg3. In yet another embodiment, the method may include stopping the RA contention resolution timer when the retransmission timer is started or restarted. In other words, in one example, the RA contention resolution timer may not be running when the retransmission timer is running and vice versa.

In some embodiments, the method may include configuring the number of re-transmission grant attempts that are available before determining that contention resolution is unsuccessful. For example, in an embodiment, the number of re-transmission grant attempts may be limited such that the retransmission timer is not started after a certain number of LBT failures happen for re-transmission grants and the contention resolution is immediately considered unsuccessful.

Figure 2A:
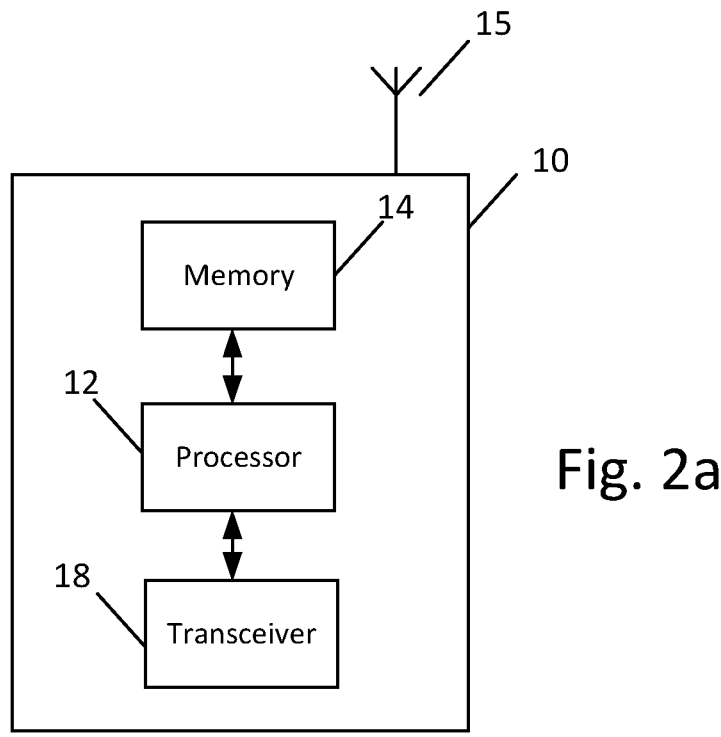
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIG. 1. In some embodiments, apparatus 10 may be configured to perform a procedure for facilitating retransmission of random access messages, for example. In an embodiment, apparatus 10 may represent a network node, such as a gNB.

Figure 2B:
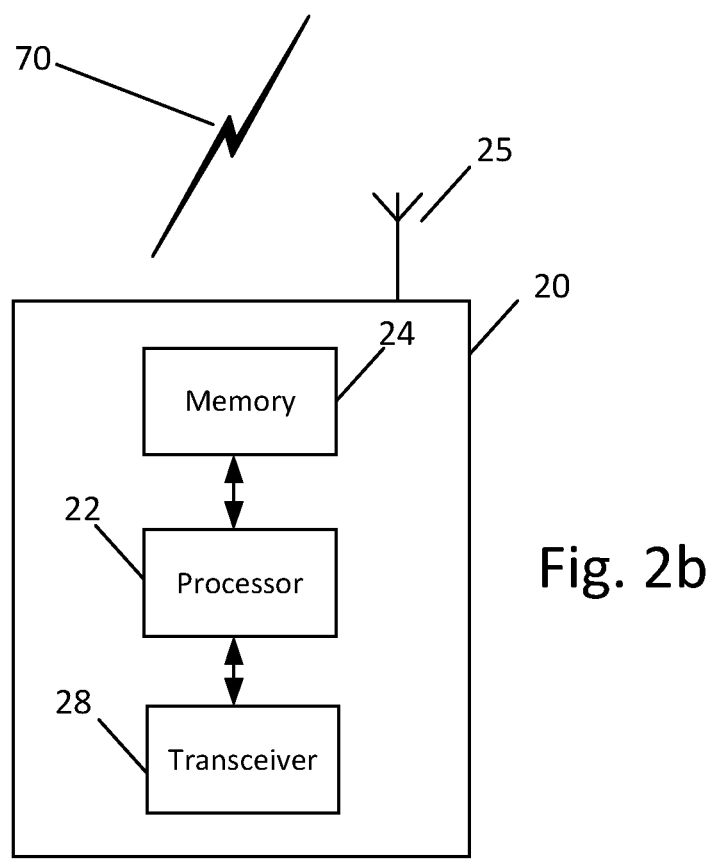
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2b.

As illustrated in the example of FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1. In certain embodiments, apparatus 20 may include or represent a MAC entity of a UE and may be configured to perform a procedure for the transmission of random access messages, for instance.

According to one embodiment, apparatus 20 may be controlled by memory 24 and processor 22 to determine or detect whether a LBT failure has occurred at the UE for one, more or all of the initial msg3 transmission opportunities. In an embodiment, when LBT failure is detected or declared, apparatus 20 may be controlled by memory 24 and processor 22 to start or re-start a retransmission timer (e.g., msg3RetxTimer). In an embodiment, apparatus 20 may be controlled by memory 24 and processor 22 to check for receipt of a retransmission grant while the retransmission timer is running.

When no retransmission grant is received before expiry of the retransmission timer, then apparatus 20 may be controlled by memory 24 and processor 22 to determine that contention resolution is unsuccessful and to fall back to RA resource selection. When a retransmission grant is received before expiry of the retransmission timer, then apparatus 20 may be controlled by memory 24 and processor 22 to stop the retransmission timer and to attempt to retransmit msg3 on the retransmission grant. In an embodiment, when the retransmission of msg3 on the retransmission grant also fails, then apparatus 20 may be controlled by memory 24 and processor 22 to determine that contention resolution is unsuccessful. In some embodiments, apparatus 20 may be controlled by memory 24 and processor 22 to restart the retransmission timer if the retransmission of msg3 on the retransmission grant fails. According to another embodiment, apparatus 20 may be controlled by memory 24 and processor 22 to restart the retransmission timer at msg3 transmission (i.e., LBT success).

In an embodiment, apparatus 20 may be controlled by memory 24 and processor 22 to start a RA contention resolution timer (e.g., the ra-ContentionResolutionTimer) after the initial Msg3 transmission opportunity or opportunities regardless of the LBT outcome and to stop the RA contention resolution timer if the retransmission timer expires. For instance, in some embodiments, the RA contention resolution timer may be restarted after each retransmission opportunity or only after successful transmission of Msg3. In another embodiment, apparatus 20 may be controlled by memory 24 and processor 22 to start the RA contention resolution timer after successful transmission of Msg3. In other words, in one example, the contention resolution may be dictated by the retransmission timer before successful transmission of Msg3.

In some embodiments, apparatus 20 may be controlled by memory 24 and processor 22 to configure the number of re-transmission grant attempts that are available. For example, in an embodiment, the number of re-transmission grant attempts may be limited such that the retransmission timer is not started after a certain number of LBT failures occur for re-transmission grants and the contention resolution is immediately considered unsuccessful.

Therefore, certain example embodiments provide several technical improvements, enhancements, and/or advantages. For example, according to certain embodiments, UE power consumption is not compromised even in the case where the UE fails LBT in all the Msg3 transmission opportunities and the network does not provide UE with a re-transmission grant. Additionally, according to certain embodiments, the network is able to provide re-transmission grant for Msg3 even without any transmission by the UE and also stop providing those grants if it determines the UE is not transmitting without compromising the UE power consumption. Further, according to example embodiments, RA procedure latency is reduced with a shorter timer for msg3 retransmission (e.g., msg3RetxTimer) and a longer timer for contention resolution (e.g., ra-ContentionResolutionTimer).

As a result, in some embodiments, the network can provide msg3 retransmission grant while the msg3RetxTimer is running and contention resolution while ra-ContentionResolutionTimer is running as its intended use is defined. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

Partial Glossary

3GPP 3rd Generation Partnership Project
5G 5th Generation Wireless System
CBRA Contention Based Random Access
CE Coverage Enhancement
CFRA Contention Free Random Access
CN Core Network
COT Channel Occupancy Time
C-RNTI Cell Radio Network Temporary Identifier
DCI Downlink Control Information
DL Downlink
DRS Discovery Reference Signal
eMTC Enhanced Machine Type Communications
eNB evolved Node B
E-UTRAN Evolved Universal Mobile Telecommunications System Terrestrial Radio Access Network
gNB Next Generation Node B
LBT Listen Before Talk
LTE Long Term Evolution
MAC Medium Access Control
MIMO Multiple Input Multiple Output
MME Mobility Management Entity
NE Network Entity
NR New Radio (5G)
NR-U New Radio-Unlicensed
PBCH Physical Broadcast Channel
PDCCH Physical Downlink Control Channel
PDU Protocol Data Unit
PHY Physical Layer
PRACH Physical Random Access Channel
PUSCH Physical Uplink Shared Channel RA Random Access
RACH Random Access Channel
RAN Radio Access Network
RAR Random Access Response
RA-RNTI Random Access Radio Network Temporary Identifier
RMSI Remaining Minimum System Information
RO Random Access Channel Occasion
SRS Sounding Reference Signal
SS Synchronization Signal
TB Transport Block
UE User Equipment.

What is claimed is:

1. An apparatus, comprising:
at least one processor; and
at least one memory including computer program code, wherein the at least one memory and the computer program code are configured, with the at least one processor, to cause the apparatus at least to:
start a retransmission timer when listen before talk failure is detected at a user equipment for one or more initial msg3 transmission opportunities;
determine whether a retransmission grant is received before expiry of the retransmission timer; and
configure a number of re-transmission grant attempts that are available before determining that contention resolution is unsuccessful, wherein the re-transmission grant attempts are limited such that the retransmission timer is not started after a number of listen before talk failures happen for re-transmission grants and the contention resolution is immediately considered unsuccessful.

2. The apparatus according to claim 1, wherein, when it is determined that no retransmission grant is received before expiry of the retransmission timer, the apparatus further caused to determine that contention resolution is unsuccessful and falling back to random access resource selection.

3. The apparatus according to claim 1, wherein, when it is determined that a retransmission grant is received before expiry of the retransmission timer, the apparatus further caused to stop the retransmission timer and attempt to transmit msg3 on the retransmission grant.

4. The apparatus according to claim 1, wherein, when there is listen before talk failure on the retransmission grant, the apparatus further caused to determine that contention resolution is unsuccessful.

5. The apparatus according to claim 1, wherein the at least one memory and the computer program code are further configured, with the at least one processor, to cause the apparatus at least to:
start or restart the retransmission timer when there is listen before talk failure on the retransmission grant.

6. The apparatus according to claim 1, wherein the at least one memory and the computer program code are further configured, with the at least one processor, to cause the apparatus at least to:
restart the retransmission timer at msg3 transmission.

7. The apparatus according to claim 1, wherein the at least one memory and the computer program code are further configured, with the at least one processor, to cause the apparatus at least to:
stop the retransmission timer at msg3 transmission.

8. The apparatus according to claim 1, wherein the at least one memory and the computer program code are further configured, with the at least one processor, to cause the apparatus at least to:
detect whether a listen before talk failure has occurred at the user equipment for one, more or all of the initial msg3 transmission opportunities.

9. The apparatus according to claim 1, wherein the determining comprises checking for receipt of a retransmission grant while the retransmission timer is running.

10. The apparatus according to claim 1, wherein the at least one memory and the computer program code are further configured, with the at least one processor, to cause the apparatus at least to:
start a random access contention resolution timer after the initial Msg3 transmission opportunity or opportunities regardless of the listen before talk outcome.

11. The apparatus according to claim 10, wherein the at least one memory and the computer program code are further configured, with the at least one processor, to cause the apparatus at least to:
stop the random access contention resolution timer when the retransmission timer expires.

12. The apparatus according to claim 10, wherein the at least one memory and the computer program code are further configured, with the at least one processor, to cause the apparatus at least to:
re-start the random access contention resolution timer after each re-transmission opportunity.

13. The apparatus according to claim 10, wherein the at least one memory and the computer program code are further configured, with the at least one processor, to cause the apparatus at least to:
start the random access contention resolution timer after successful transmission of msg3.

14. The apparatus according to claim 10, wherein the at least one memory and the computer program code are further configured, with the at least one processor, to cause the apparatus at least to:
stop the random access contention resolution timer when retransmission timer is started or restarted.

15. A method, comprising:
starting a retransmission timer when listen before talk failure is detected at a user equipment for one or more initial msg3 transmission opportunities;
determining whether a retransmission grant is received before expiry of the retransmission timer; and
configuring a number of re-transmission grant attempts that are available before determining that contention resolution is unsuccessful, wherein the re-transmission grant attempts are limited such that the retransmission timer is not started after a number of listen before talk failures happen for re-transmission grants and the contention resolution is immediately considered unsuccessful.

16. The method according to claim 15, wherein, when it is determined that no retransmission grant is received before expiry of the retransmission timer, the method further comprises determining that contention resolution is unsuccessful and falling back to random access resource selection.

17. The method according to claim 15, wherein, when it is determined that a retransmission grant is received before expiry of the retransmission timer, the method further comprises stopping the retransmission timer and attempting to transmit msg3 on the retransmission grant.

18. The method according to claim 15, wherein, when there is listen before talk failure on the retransmission grant, the method further comprises determining that contention resolution is unsuccessful.

19. A non-transitory computer-readable medium comprising program instructions stored thereon, which when executed by at least one processor, cause an apparatus at least to:
- start a retransmission timer when listen before talk failure is detected at a user equipment for one or more initial msg3 transmission opportunities;
- determine whether a retransmission grant is received before expiry of the retransmission timer; and
- configure a number of re-transmission grant attempts that are available before determining that contention resolution is unsuccessful, wherein the re-transmission grant attempts are limited such that the retransmission timer is not started after a number of listen before talk failures happen for re-transmission grants and the contention resolution is immediately considered unsuccessful.

* * * * *